(12) United States Patent
Yamamoto et al.

(10) Patent No.: US 10,714,995 B2
(45) Date of Patent: Jul. 14, 2020

(54) ROTOR FOR ROTARY ELECTRIC MACHINE AND MANUFACTURING METHOD

(71) Applicant: AISIN AW CO., LTD., Anjo-shi, Aichi (JP)

(72) Inventors: Yoshihisa Yamamoto, Anjo (JP); Yoshinari Nakagawa, Nishio (JP); Yasunari Furuta, Chiryu (JP); Shinya Katayama, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 366 days.

(21) Appl. No.: 15/540,794

(22) PCT Filed: Mar. 18, 2016

(86) PCT No.: PCT/JP2016/058819
§ 371 (c)(1),
(2) Date: Jun. 29, 2017

(87) PCT Pub. No.: WO2016/148294
PCT Pub. Date: Sep. 22, 2016

(65) Prior Publication Data
US 2017/0353067 A1 Dec. 7, 2017

(30) Foreign Application Priority Data

Mar. 18, 2015 (JP) .................................. 2015-055062
Sep. 3, 2015 (JP) .................................. 2015-173748

(51) Int. Cl.
*H02K 1/27* (2006.01)
*H02K 1/28* (2006.01)

(52) U.S. Cl.
CPC ............. *H02K 1/278* (2013.01); *H02K 1/276* (2013.01); *H02K 1/28* (2013.01); *H02K 2201/09* (2013.01)

(58) Field of Classification Search
CPC .......... H02K 1/278; H02K 1/276; H02K 1/28; H02K 2201/09
(Continued)

(56) References Cited

U.S. PATENT DOCUMENTS

2012/0091845 A1* 4/2012 Takemoto ............ H02K 1/276
310/156.01
2013/0162089 A1* 6/2013 Komuro ................ H02K 1/02
310/156.01

(Continued)

FOREIGN PATENT DOCUMENTS

JP 2001-169485 A 6/2001
JP 2002-345188 A 11/2002
(Continued)

OTHER PUBLICATIONS

Jun. 14, 2016 International Search Report issued in International Patent Application No. PCT/JP2016/058819.

*Primary Examiner* — Forrest M Phillips
(74) *Attorney, Agent, or Firm* — Oliff PLC

(57) ABSTRACT

A rotor for a rotary electric machine, the rotor including a rotor core that has a magnet hole; a permanent magnet inserted into the magnet hole; and an adhesive layer provided between the permanent magnet and a wall surface of the magnet hole and including a plurality of capsule bodies therein, the adhesive layer fixing the permanent magnet to the wall surface of the magnet hole, wherein the adhesive layer is provided only on a wall surface of the magnet hole on a first side, which is one of a wall surface of the magnet hole on an inner side in a radial direction and a wall surface on an outer side in the radial direction.

12 Claims, 9 Drawing Sheets

(58) Field of Classification Search
USPC .................................................. 310/156.01
See application file for complete search history.

(56) References Cited

U.S. PATENT DOCUMENTS

| | | | | |
|---|---|---|---|---|
| 2013/0328432 | A1* | 12/2013 | Hoemann | ............ H02K 1/2786 |
| | | | | 310/156.12 |
| 2014/0084729 | A1* | 3/2014 | Nakazono | ................ H02K 1/27 |
| | | | | 310/156.01 |

FOREIGN PATENT DOCUMENTS

| | | |
|---|---|---|
| JP | 2007-060836 A | 3/2007 |
| JP | 2010-183791 A | 8/2010 |
| JP | 2012-244838 A | 12/2012 |
| JP | 2013-78164 A | 4/2013 |

* cited by examiner

ROTOR FOR ROTARY ELECTRIC MACHINE AND MANUFACTURING METHOD

BACKGROUND

The present disclosure relates to a rotor for a rotary electric machine and a manufacturing method.

There is known a technique for a rotor for an interior permanent magnet motor that includes a permanent magnet inserted into a magnet insertion hole formed in a rotor core and secured using an adhesive. In the rotor, a groove is formed in the inner surface of the magnet insertion hole and/or the surface of the permanent magnet so as to extend in the axial direction of the rotor core. The groove can be engageable with a narrow streak member that guide insertion of the permanent magnet when the permanent magnet is inserted into the magnet insertion hole (see Japanese Patent Application Publication No. 2007-60836, for example).

SUMMARY

With the configuration described in Japanese Patent Application Publication No. 2007-60836, however, it is necessary to insert or cut, for example, the narrow streak member to position the permanent magnet with respect to the magnet insertion hole, which complicates the manufacturing process.

An exemplary aspect of the disclosure provides a rotor for a rotary electric machine and a manufacturing method in which a permanent magnet is positioned with respect to a magnet hole portion without using a narrow streak member.

An exemplary aspect of the present disclosure provides a rotor for a rotary electric machine, the rotor including: a rotor core that has a magnet hole; a permanent magnet inserted into the magnet hole; and an adhesive layer provided between the permanent magnet and a wall surface of the magnet hole and including a plurality of capsule bodies therein, the adhesive layer fixing the permanent magnet to the wall surface of the magnet hole, in which the adhesive layer is provided only on a wall surface of the magnet hole on a first side, which is one of a wall surface of the magnet hole on an inner side in a radial direction and a wall surface on an outer side in the radial direction.

Another exemplary aspect of the present disclosure provides a manufacturing method for a rotor for a rotary electric machine, the method including: inserting a permanent magnet into a magnet hole of a rotor core; applying an adhesive including a plurality of capsule bodies therein to a wall surface of the magnet hole on a first side, which is one of a wall surface of the magnet hole on an inner side in a radial direction and a wall surface on an outer side in the radial direction, or a surface of the permanent magnet that faces the wall surface on the first side; and forming an adhesive layer by heating the adhesive.

According to the present disclosure, it is possible to obtain a rotor for a rotary electric machine and a manufacturing method in which a permanent magnet is positioned with respect to a magnet hole without using a narrow streak member.

DETAILED DESCRIPTION OF EMBODIMENTS

Embodiments will be described in detail below with reference to the accompanying drawings.

Figure 1:
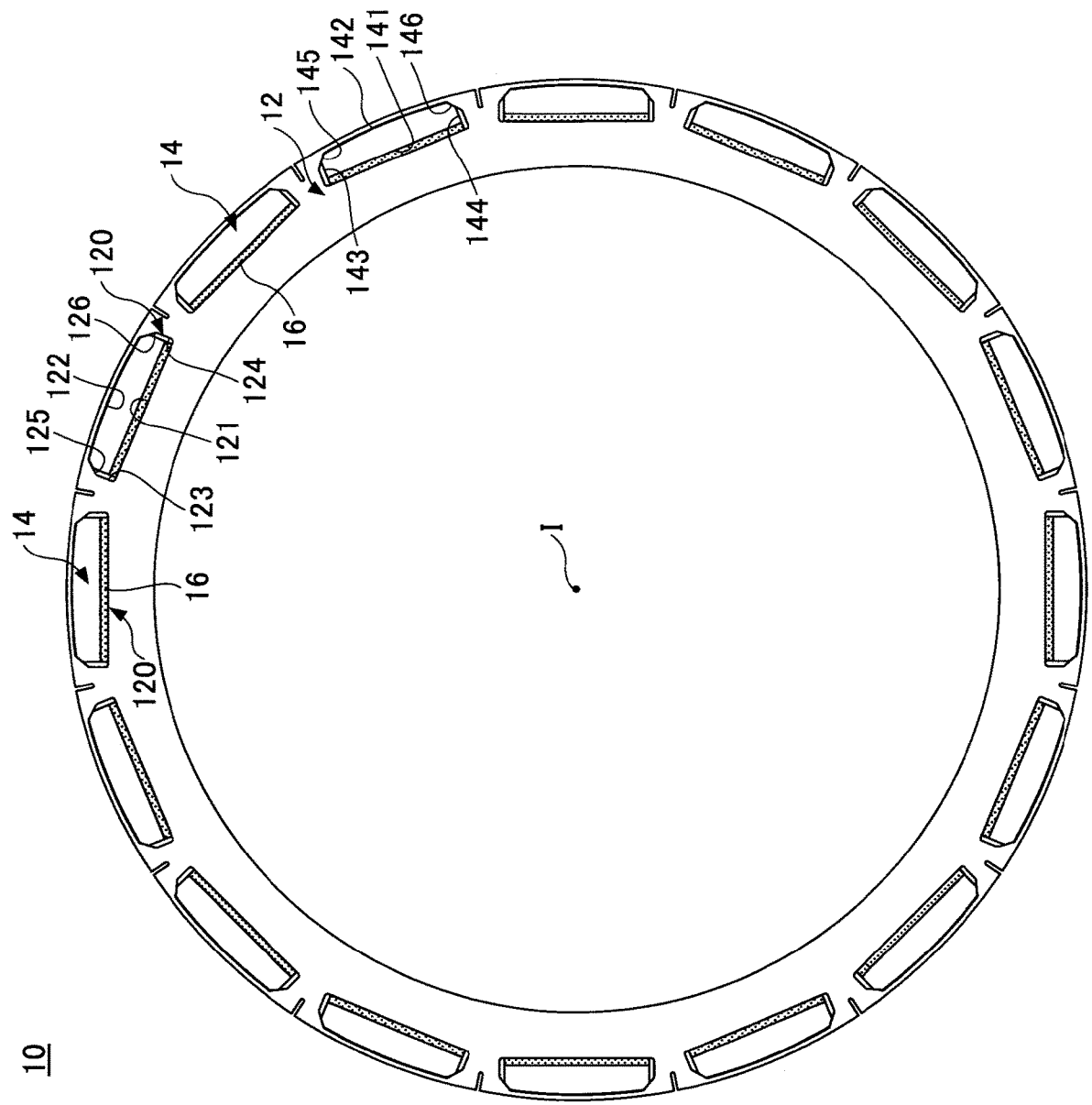
FIG. 1 is a plan view illustrating a rotor according to an embodiment (first embodiment).

FIG. 1 is a plan view illustrating a rotor 10 according to an embodiment (first embodiment). In FIG. 1, other constituent elements (such as a shaft and end plates, for example) that may be included in the rotor 10 are not illustrated. In the following description, unless otherwise mentioned, the radial and axial directions are determined with reference to a center axis I of the rotor 10 (=a rotational axis of a motor). In FIG. 1 etc., in addition, adhesive layers 16 (and also adhesive layers 16A etc.) are illustrated as hatched with "fine dots" for ease of viewing.

The rotor 10 is used in a rotary electric machine of an inner rotor type. For example, the rotor 10 may be used in a travel motor for use in a hybrid vehicle or an electric vehicle. As illustrated in FIG. 1, the rotor 10 has an annular form in plan view. The rotor 10 has a predetermined thickness in the axial direction. That is, the rotor 10 has a form in which the annular form illustrated in FIG. 1 is continuous in the axial direction.

The rotor 10 includes a rotor core 12, permanent magnets 14, and adhesive layers 16.

The rotor core 12 is formed from stacked silicon steel plates, for example. The rotor core 12 has magnet hole portions (slot holes or magnet holes) 120. As illustrated in FIG. 1, a plurality of magnet hole portions 120 are formed in the circumferential direction. The magnet hole portions 120 have the same shape.

The rotor core 12 is for use in an IPM (Internal Permanent Magnet) motor, and the magnet hole portions 120 do not open in the radial direction of the rotor core 12. That is, the magnet hole portions 120 open only in the axial direction in both end surfaces of the rotor core 12 in the axial direction. It should be noted, however, that the magnet hole portions 120 may open only partially in the radial direction of the rotor core 12 as long as the magnet hole portions 120 have surfaces that abut against the permanent magnets 14 in the radial direction on the radially outer side. The shape (opening shape) of the magnet hole portions 120 as viewed in plan may be determined as desired. Some examples of such a shape will be discussed later. In the example illustrated in FIG. 1, in the magnet hole portion 120, a wall surface 122 on the outer side in the radial direction, of a wall surface 121 on the inner side in the radial direction and the wall surface 122 on the outer side in the radial direction, includes tapered surfaces 125 and 126 provided at end portions on both sides in the circumferential direction and connected to wall surfaces 123 and 124, respectively, on both sides in the circumferential direction. The tapered surfaces 125 and 126 extend in oblique directions with respect to the wall surface 122 (a center portion thereof in the circumferential direction) and the wall surfaces 123 and 124. The term "tapered surface" as used herein means a surface that makes surface contact with a corresponding surface of the permanent magnet 14. Thus, the "tapered surface" does not include a round surface that does not make surface contact with the permanent magnet 14.

The permanent magnets 14 are formed from neodymium magnets, for example. The permanent magnets 14 are inserted into the magnet hole portions 120. The permanent magnets 14 are inserted into the respective magnet hole portions 120. The permanent magnets 14 have the same shape. The shape (sectional shape) of the permanent magnets 14 as viewed in plan may be determined as desired. Some examples of such a shape will be discussed later. In the example illustrated in FIG. 1, in each permanent magnet 14, a surface 142 on the outer side in the radial direction, of a surface 141 on the inner side in the radial direction and the surface 142 on the outer side in the radial direction, and surfaces 143 and 144 on both sides in the circumferential direction are connected via tapered surfaces 145 and 146, respectively, that extend in oblique directions with respect to the surfaces 142, 143, and 144. The tapered surfaces 145 and 146 of each permanent magnet 14 are formed so as to extend along (make surface contact with) the tapered surfaces 125 and 126, respectively, of the corresponding magnet hole portion 120. In addition, the surface 142 of each permanent magnet 14 is formed so as to extend along the wall surface 122 of the corresponding magnet hole portion 120 at a slight distance therefrom.

The adhesive layer 16 is provided between the permanent magnet 14 and the wall surface 121 of the magnet hole portion 120 in such a manner as to adhere to both the permanent magnet 14 and the wall surface 121 of the magnet hole portion 120. The adhesive layer 16 is provided for each set of the corresponding permanent magnet 14 and magnet hole portion 120. The adhesive layers 16 for the sets have substantially the same configuration. The adhesive layer 16 fixes the corresponding permanent magnet 14 to the wall surface 121 of the magnet hole portion 120 which faces the permanent magnet 14. The adhesive layer 16 is provided to extend over the entirety of the corresponding permanent magnet 14 and magnet hole portion 120 in the axial direction. Hereinafter, focus is placed on one of the magnet hole portions 120, and the one of the magnet hole portions 120 and the permanent magnet 14 and the adhesive layer 16 which are provided for the one magnet hole portion 120 will be described.

Figure 2:
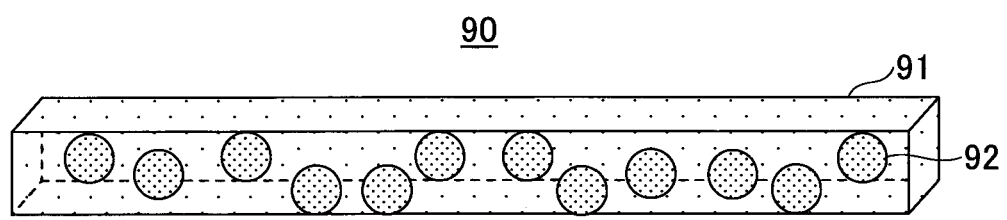
FIG. 2 illustrates the structure of an adhesive layer.
Figure 3:
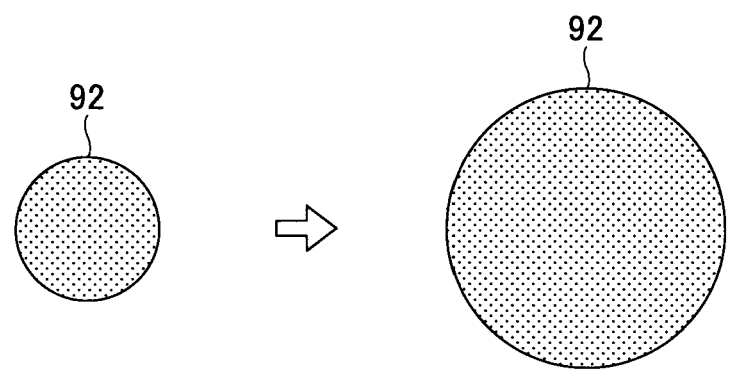
FIG. 3 illustrates the concept of states of a capsule body before and after being expanded by being heated.

FIG. 2 illustrates the structure of the adhesive layer 16, and is a perspective view illustrating the concept of an adhesive 90 before being heated in a simple state (sheet-like state). FIG. 3 illustrates the concept of states of a capsule body 92 before and after being expanded by being heated.

The adhesive layer 16 is formed by heating an adhesive compounded with multiple capsules that are expanded when heated. In the example illustrated in FIG. 2, the adhesive 90 is an epoxy resin 91 compounded with multiple capsule bodies 92 that are expanded when heated. When heated, the capsule body 92 is expanded from the state before being heated illustrated on the left side of FIG. 3 to the state after being heated illustrated on the right side of FIG. 3. As a result, the entire adhesive 90 is expanded when heated so that the adhesive layer 16 is formed after being heated (after being cured). The capsule bodies 92 which have been present since before being heated remain as expanded capsule bodies in the adhesive layer 16 also after being heated.

Figure 4A:
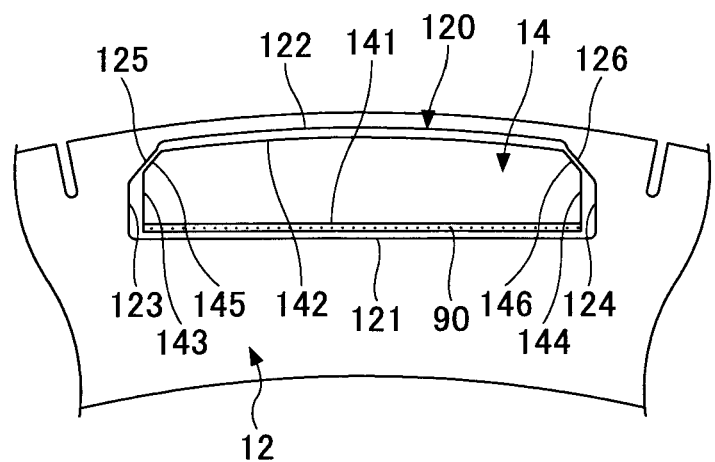
FIG. 4A illustrates the manner of formation of the adhesive layer in a magnet hole portion.
Figure 4B:
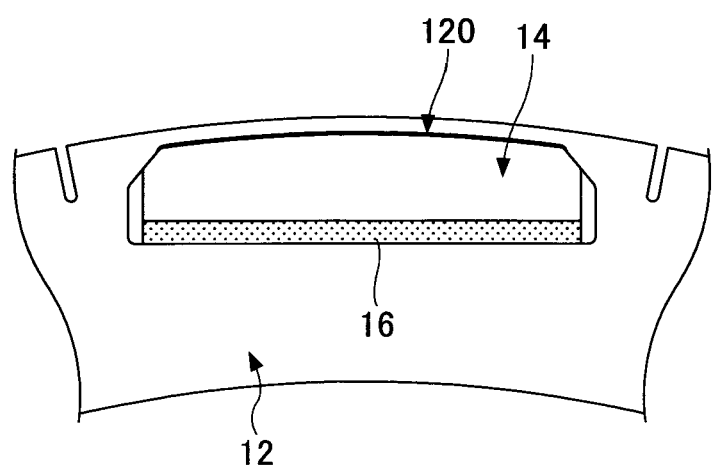
FIG. 4B illustrates the manner of formation of the adhesive layer in the magnet hole portion.

FIGS. 4A and 4B illustrate the manner of formation of the adhesive layer 16 in the magnet hole portion 120. FIG. 4A illustrates a state in which the permanent magnet 14 to which the adhesive 90 before being heated has been applied or affixed is inserted into the magnet hole portion 120. FIG. 4B illustrates a state in which the adhesive layer 16 after being heated has been formed.

As illustrated in FIG. 4A, the permanent magnet 14 to which the adhesive 90 has been applied or affixed (hereinafter, representatively expressed as "applied") is inserted into the magnet hole portion 120 in the axial direction. The adhesive 90 has been applied only to the surface 141 of the permanent magnet 14 on the radially inner side (the surface 141 which faces the wall surface 121 of the magnet hole portion 120). When heating processing is performed in the state illustrated in FIG. 4A, the adhesive layer 16 is formed by the adhesive 90 which has been expanded as illustrated in FIG. 4B. Here, the adhesive 90 is applied to the permanent magnet 14 side. However, the adhesive 90 may be applied to the magnet hole portion 120 side.

Here, in the heating processing, the radially inner side of the adhesive layer 16 contacts the wall surface 121 of the magnet hole portion 120 on the radially inner side through expansion of the adhesive 90. When the adhesive 90 is further expanded, a force toward the radially outer side is mainly applied to the permanent magnet 14 in the magnet hole portion 120. Consequently, in the course of the expansion of the adhesive 90, the permanent magnet 14 in the magnet hole portion 120 is moved toward the wall surface 122 of the magnet hole portion 120 on the radially outer side. When the permanent magnet 14 is moved toward the wall surface 122, the tapered surfaces 145 and 146 of the permanent magnet 14 contact the tapered surfaces 125 and 126, respectively, of the magnet hole portion 120. Consequently, the permanent magnet 14 is positioned in the radial direction in such a manner as to be guided along the tapered surfaces 125 and 126 of the magnet hole portion 120 (in such a manner as to be positioned in the circumferential direction). As a result, the permanent magnet 14 is positioned in the circumferential direction and the radial direction with respect to the magnet hole portion 120. That is, the permanent magnet 14 is fixed with respect to the rotor core 12 with the tapered surfaces 146 and 146 extending along (in surface contact with) the tapered surfaces 125 and 126, respectively, of the magnet hole portion 120. In this event, a slight clearance may be formed between the surface 142 and the center portion of the wall surface 122 of the magnet hole portion 120 in the circumferential direction. Consequently, the positioning function of the tapered surfaces 125 and 126 of the wall surface 122 can be enhanced.

Figure 5:
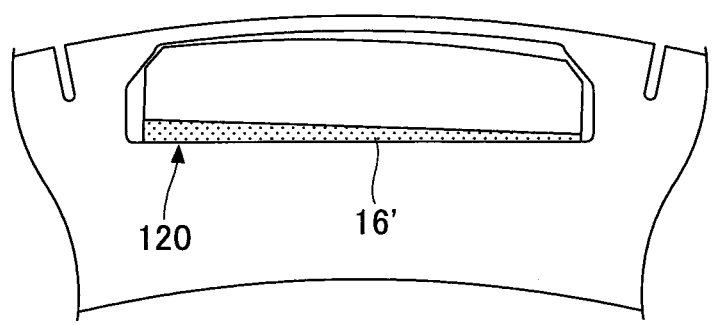
FIG. 5 illustrates a rotor that includes an adhesive layer according to a comparative example.

FIG. 5 illustrates a rotor that includes an adhesive layer 16' according to a comparative example. In the comparative example, the adhesive layer 16' is formed using an adhesive not compounded with the capsule bodies 92. With such a comparative example, as illustrated in FIG. 5, a clearance may be formed between a wall surface of the magnet hole portion 120 on the radially outer side and the permanent magnet because of dripping of the adhesive during curing processing or the like, and the permanent magnet cannot be positioned with respect to the magnet hole portion.

In this respect, with the embodiment in which the adhesive 90 which is thermally expandable is used, individual differences for the clearance in the radial direction between the center portion, in the circumferential direction, of the wall surface 122 of the magnet hole portion 120 on the radially outer side and the permanent magnet 14 can be reduced as illustrated in FIG. 4B, even if the thickness of the adhesive 90 in the applied state is not uniform. In addition, as discussed above, the permanent magnet 14 can be fixed by being positioned with respect to the magnet hole portion 120 by use of thermal expansion of the adhesive 90. As a result, motor torque fluctuations, variations, and so forth due to fluctuations in position of the permanent magnets 14 in the respective magnet hole portions 120 can be reduced.

Next, a rotor 10A according to another embodiment (second embodiment) will be described with reference to FIGS. 6 and 7.

The rotor 10A according to the second embodiment mainly differs from the rotor 10 according to the first embodiment discussed above in that the adhesive layer 16 has been replaced with an adhesive layer 16A and that a shaft 18 and end plates 191 and 192 are formed with oil passages 74, 73, and 72, respectively. Hereinafter, constituent elements that are the same as those of the rotor 10 according to the first embodiment discussed above are given the same reference numerals to omit description.

Figure 6:
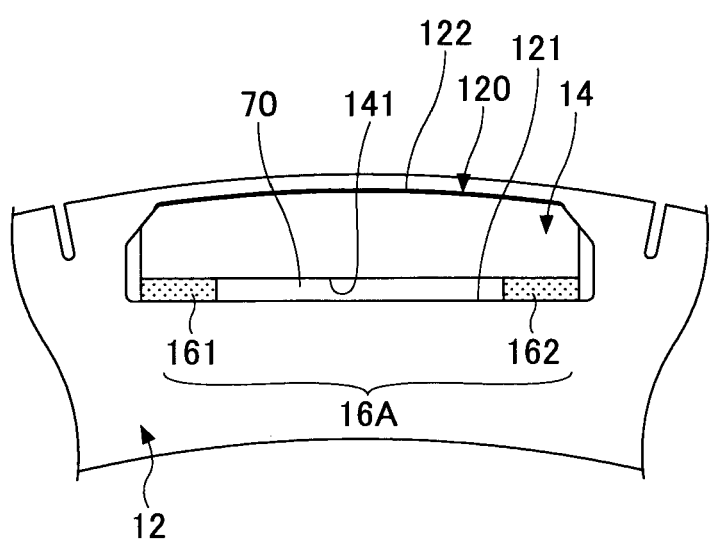
FIG. 6 is a plan view of a portion of a rotor that includes one magnet hole portion.
Figure 7:
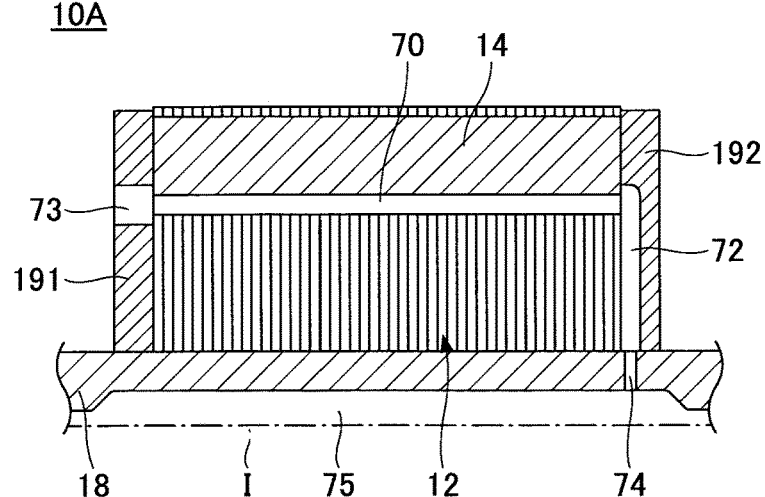
FIG. 7 is a sectional view of the rotor taken along a plane that includes a center axis of the rotor.

FIG. 6 is a plan view of a portion of the rotor 10A that includes one magnet hole portion 120. FIG. 7 is a sectional view of the rotor 10A taken along a plane that includes the center axis I of the rotor 10A, illustrating only half of the rotor 10A on one side with respect to the center axis I of the rotor 10A.

The adhesive layer 16A is the same as the adhesive layer 16 according to the first embodiment discussed above except for the location of formation. That is, the adhesive layer 16A is formed by heating an adhesive compounded with capsules that are expanded when heated.

The adhesive layer 16A forms an oil passage 70 between both ends of the permanent magnet 14 in the circumferential direction. The oil passage 70 is blocked on both sides in the circumferential direction. Specifically, the adhesive layer 16A includes a first adhesive layer 161 and a second adhesive layer 162. The first adhesive layer 161 is provided at one end, in the circumferential direction, of the surface 141 of the permanent magnet 14 on the radially inner side. The second adhesive layer 162 is provided at the other end, in the circumferential direction, of the surface 141. The first adhesive layer 161 and the second adhesive layer 162 are provided to extend over the entire permanent magnet 14 in the axial direction. The first adhesive layer 161 and the second adhesive layer 162 are apart from each other in the circumferential direction. The oil passage 70 is formed between the first adhesive layer 161 and the second adhesive layer 162 in the circumferential direction. As illustrated in FIG. 7, the oil passage 70 opens at both ends of the rotor core 12 in the axial direction, and communicates with the oil passages 73 and 72 in the end plates 191 and 192, respectively.

The end plate 191 is provided around the shaft 18 so as to cover an end surface of the rotor 10A on one end side in the axial direction. The end plate 192 is provided around the shaft 18 so as to cover an end surface of the rotor 10A on the other end side in the axial direction. The end plate 191 has the oil passages 73 which are formed so as to penetrate the end plate 191 in the axial direction at positions corresponding to the oil passages 70. The end plate 192 has the oil passages 72 which are formed so as not to penetrate the end plate 192 in the axial direction at positions corresponding to the oil passages 70. As illustrated in FIG. 7, the oil passages 72 extend in the radial direction, and communicate with the respective oil passages 74 which are formed in the shaft 18. The oil passages 72 may be formed in such a manner as to extend radially from the center axis I side as viewed in the axial direction.

An oil passage 75 which is a hollow portion is formed in the shaft 18. The oil passage 75 extends in the axial direction. The oil passages 74 extend in the radial direction, and communicate with the oil passage 54.

When the rotor 10A is rotated during operation of the rotor 10A, oil in the oil passage 75 flows radially outward through the oil passages 74 and the oil passages 72 by the action of the centrifugal force or the discharge pressure. After that, the oil flows in the axial direction through the oil passages 70, and flows further downstream via the oil passages 73. When the oil passes through the oil passages 70, the permanent magnets 14 are cooled. In this way, the permanent magnets 14 can be cooled by forming the oil passages 70 using the adhesive layers 16A.

In this way, with the second embodiment, in addition to the effect according to the first embodiment discussed above, the permanent magnets 14 can be cooled by forming the oil passages 70 using the adhesive layers 16A. The oil passages 70 are blocked by the first adhesive layer 161 and the second adhesive layer 162 on both sides in the circumferential direction, and blocked by the permanent magnets 14 on the radially outer side. Thus, leakage of oil flowing in the oil passages 70 can be reduced.

In the case where the oil passages are formed by the rotor core 12 which is formed from stacked steel sheets, oil may leak radially outward through gaps between stacked plates of the rotor core 12. In the case where the adhesive layer 16A is provided on the radially outer side, rather than the radially inner side, with respect to the permanent magnet 14, for example, oil may leak radially outward through gaps between stacked plates of the rotor core 12. With the second embodiment, in contrast, the oil passages 70 are blocked by the permanent magnets 14 on the radially outer side, and thus it is possible to effectively prevent oil from leaking radially outward because of the centrifugal force.

Next, rotors 10B to 10E according to other embodiments (other examples of the configuration of magnet hole portions and adhesive layers) will be described with reference to FIGS. 8 to 11.

FIGS. 8 to 11 are each a plan view of a portion of a rotor 10B to 10E that includes one magnet hole portion 120B and 120C.

Figure 8:
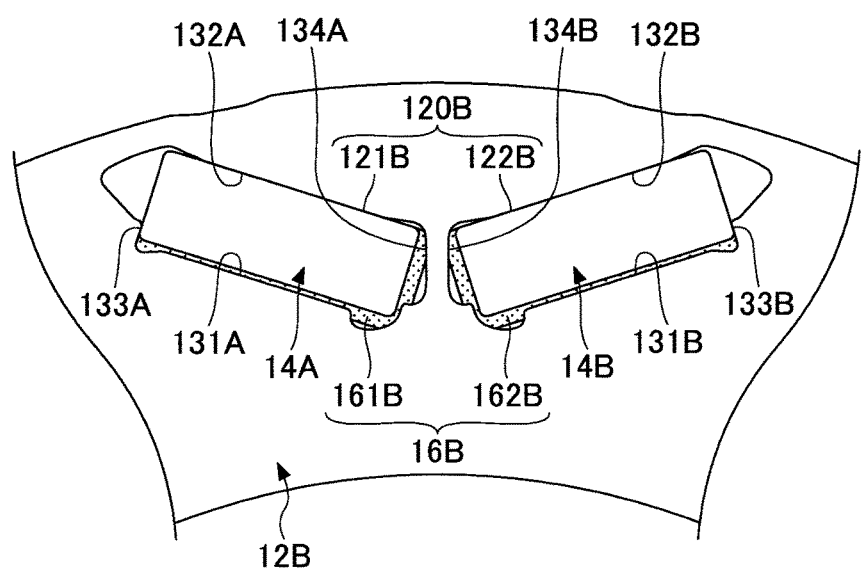
FIG. 8 is a plan view of a portion of a rotor.

In the example illustrated in FIG. 8, the rotor 10B includes a rotor core 12B, permanent magnets 14A and 14B, and an adhesive layer 16B.

The rotor core 12B is different from the rotor core 12 according to the first embodiment discussed above in that the magnet hole portion 120 has been replaced with the magnet hole portion 120B. The magnet hole portion 120B includes a first magnet hole 121B and a second magnet hole 122B disposed in a V-shape. The permanent magnets 14A and 14B are inserted into the first magnet hole 121B and the second magnet hole 122B, respectively.

The permanent magnets 14A and 14B are different in shape from the permanent magnet 14 according to the first embodiment discussed above, and do not include the tapered surfaces 145 and 146. The permanent magnets 14A and 14B have a shape generally corresponding to that of the first magnet hole 121B and the second magnet hole 122B, respectively.

The adhesive layer 16B is formed by heating an adhesive compounded with capsules that are expanded when heated, as with the adhesive layer 16 according to the first embodiment discussed above. As illustrated in FIG. 8, the adhesive layer 16B includes an adhesive layer 161B provided for the first magnet hole 121B and an adhesive layer 162B provided for the second magnet hole 122B.

The adhesive layer 161B fixes the permanent magnet 14A with respect to the first magnet hole 121B. As illustrated in FIG. 8, the adhesive layer 161B is provided only on a wall surface 131A of the first magnet hole 121B on the radially inner side, of the wall surface 131A on the inner side in the radial direction and a wall surface 132A on the outer side in the radial direction, and a wall surface 134A of the first magnet hole 121B on one side (in the example, the side closer to the second magnet hole 122B) in the circumferential direction, of a wall surface 133A and the wall surface 134A of the first magnet hole 121B on both sides in the circumferential direction. Consequently, as illustrated in FIG. 8, the permanent magnet 14A is fixed by being positioned with respect to the first magnet hole 121B in such a manner as to contact the wall surface 132A of the first magnet hole 121B on the radially outer side and the wall surface 133A thereof on the other side in the circumferential direction (that is, in such a manner as to be positioned in the radial direction and the circumferential direction) through thermal expansion of the adhesive during formation of the adhesive layer 161B.

The adhesive layer 162B fixes the permanent magnet 14B with respect to the second magnet hole 122B. As illustrated in FIG. 8, the adhesive layer 162B is provided only on a wall surface 131B of the second magnet hole 122B on the radially inner side, of the wall surface 131B on the inner side in the radial direction and a wall surface 132B on the outer side in the radial direction, and a wall surface 134B of the second magnet hole 122B on one side (in the example, the side closer to the first magnet hole 121B) in the circumferential direction, of a wall surface 133B and the wall surface 134B of the second magnet hole 122B on both sides in the circumferential direction. Consequently, as illustrated in FIG. 8, the permanent magnet 14B is fixed by being positioned with respect to the second magnet hole 122B in such a manner as to contact the wall surface 132B of the second magnet hole 122B on the radially outer side and the wall surface 133B thereof on the other side in the circumferential direction (that is, in such a manner as to be positioned in the radial direction and the circumferential direction) through thermal expansion of the adhesive during formation of the adhesive layer 162B.

Figure 9:
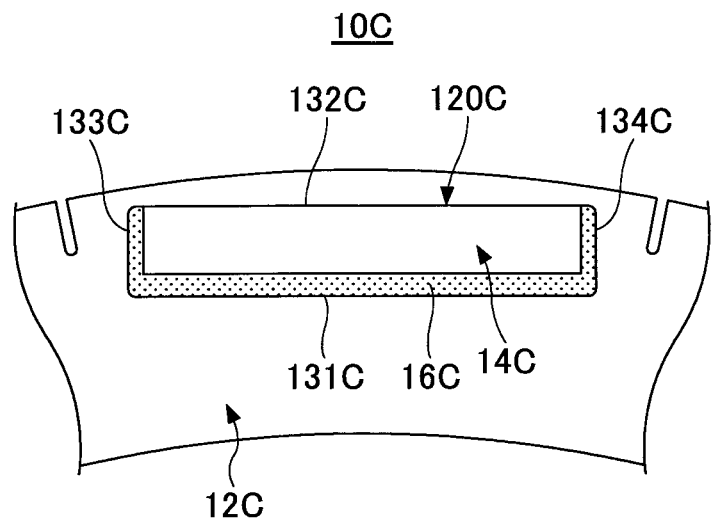
FIG. 9 is a plan view of a portion of a rotor.

In the example illustrated in FIG. 9, the rotor 10C includes a rotor core 12C, a permanent magnet 14C, and an adhesive layer 16C.

The rotor core 12C is different from the rotor core 12 according to the first embodiment discussed above in that the magnet hole portion 120 has been replaced with a magnet hole portion 120C. Unlike the magnet hole portion 120 according to the first embodiment discussed above, the magnet hole portion 120C does not include the tapered surfaces 125 and 126. That is, a wall surface 132C of the magnet hole portion 120C on the radially outer side, of a wall surface 131C on the inner side in the radial direction and the wall surface 132C on the outer side in the radial direction, and wall surfaces 133C and 134C on both sides in the circumferential direction are connected to each other not via a tapered surface.

The permanent magnet 14C is different in shape from the permanent magnet 14 according to the first embodiment discussed above, and does not include the tapered surfaces 145 and 146. The permanent magnet 14C has a shape generally corresponding to that of the magnet hole portion 120C.

The adhesive layer 16C is formed by heating an adhesive compounded with capsules that are expanded when heated, as with the adhesive layer 16 according to the first embodiment discussed above. As illustrated in FIG. 9, the adhesive layer 16C is provided only on the wall surface 131C on the radially inner side and the wall surfaces 133C and 134C on both sides in the circumferential direction, of the wall surfaces of the magnet hole portion 120C on the four sides. That is, as illustrated in FIG. 9, the adhesive layer 16C is not provided on the wall surface 132C on the radially outer side, of the wall surfaces of the magnet hole portion 120C on the four sides. Consequently, as illustrated in FIG. 9, the permanent magnet 14C is fixed by being positioned with respect to the magnet hole portion 120C in such a manner as to contact the wall surface 132C of the magnet hole portion 120C on the radially outer side (that is, in such a manner as to be positioned in the radial direction) through thermal expansion of the adhesive during formation of the adhesive layer 16C.

Figure 10:
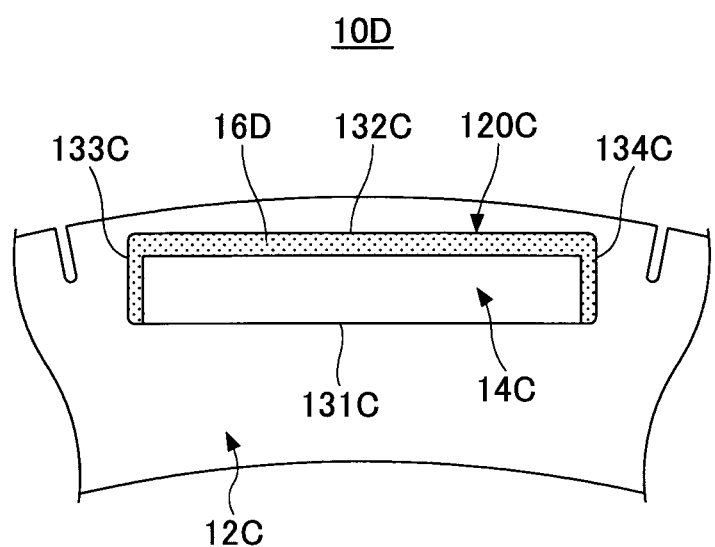
FIG. 10 is a plan view of a portion of a rotor.

In the example illustrated in FIG. 10, the rotor 10D includes a rotor core 12C, a permanent magnet 14C, and an adhesive layer 16D. The rotor 10D is different from the rotor 10C illustrated in FIG. 9 in that the adhesive layer 16C has been replaced with the adhesive layer 16D.

The adhesive layer 16D is formed by heating an adhesive compounded with capsules that are expanded when heated, as with the adhesive layer 16 according to the first embodiment discussed above. As illustrated in FIG. 10, the adhesive layer 16D is provided on only the wall surface 132C on the radially outer side and the wall surfaces 133C and 134C on both sides in the circumferential direction, of the wall surfaces of the magnet hole portion 120C on the four sides. That is, as illustrated in FIG. 10, the adhesive layer 16D is not provided on the wall surface 131C on the radially inner side, of the wall surfaces of the magnet hole portion 120C on the four sides. Consequently, as illustrated in FIG. 10, the permanent magnet 14C is fixed by being positioned with respect to the magnet hole portion 120C in such a manner as to contact the wall surface 131C of the magnet hole portion 120C on the radially inner side (that is, in such a manner as to be positioned in the radial direction) through thermal expansion of the adhesive during formation of the adhesive layer 16D.

Figure 11:
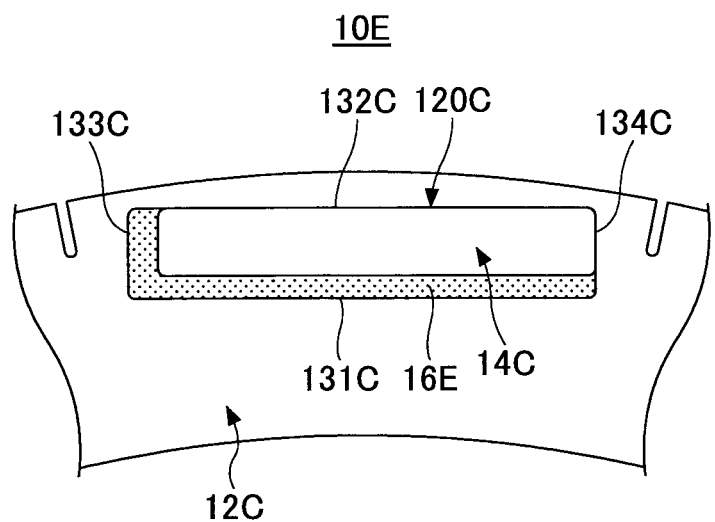
FIG. 11 is a plan view of a portion of a rotor.

In the example illustrated in FIG. 11, the rotor 10E includes a rotor core 12C, a permanent magnet 14C, and an adhesive layer 16E. The rotor 10E is different from the rotor 10C illustrated in FIG. 9 in that the adhesive layer 16C has been replaced with the adhesive layer 16E.

The adhesive layer 16E is formed by heating an adhesive compounded with capsules that are expanded when heated, as with the adhesive layer 16 according to the first embodiment discussed above. As illustrated in FIG. 11, the adhesive layer 16E is provided only on the wall surface 131C on the radially inner side, of the wall surfaces of the magnet hole portion 120C on the four sides, and the wall surface 133C on one side, of the wall surfaces 133C and 134C on both sides in the circumferential direction. That is, as illustrated in FIG. 11, the adhesive layer 16E is not provided on the wall surface 132C and the wall surface 134C, of the wall surfaces of the magnet hole portion 120C on the four sides. Consequently, as illustrated in FIG. 11, the permanent magnet 14C is fixed by being positioned with respect to the magnet hole portion 120C in such a manner as to contact the wall surface 132C of the magnet hole portion 120C on the radially outer side and the wall surface 134C (that is, in such a manner as to be positioned in the radial direction and the circumferential direction) through thermal expansion of the adhesive during formation of the adhesive layer 16E.

Next, rotors 10F to 10I according to other embodiments will be described with reference to FIGS. 12 to 15.

FIGS. 12 to 15 are each a plan view of a portion of a rotor 10F to 10I that includes one magnet hole portion 120F to 120I.

Figure 12:
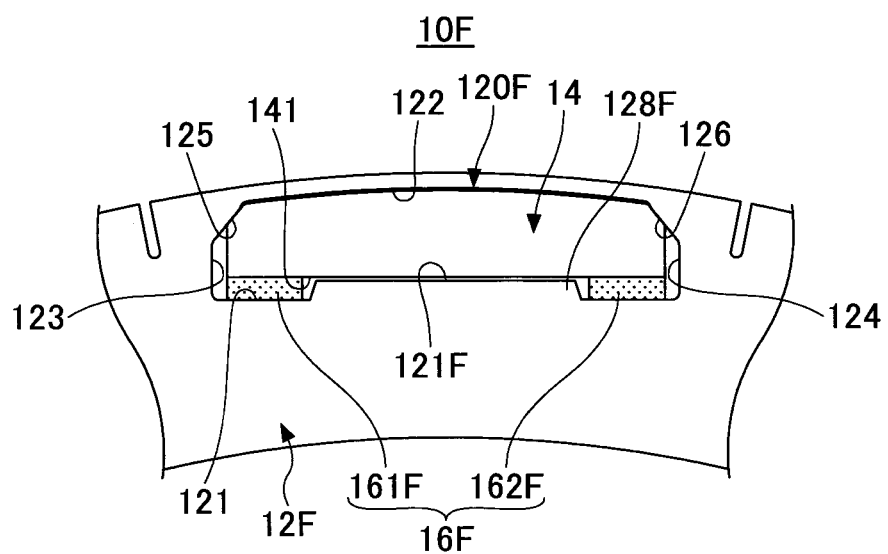
FIG. 12 is a plan view of a portion of a rotor.

The rotor 10F illustrated in FIG. 12 is different from the rotor 10 according to the first embodiment discussed above in that the rotor core 12 has been replaced with a rotor core 12F and the adhesive layer 16 has been replaced with an adhesive layer 16F. Hereinafter, constituent elements that are the same as those of the rotor 10 according to the first embodiment discussed above are given the same reference numerals to omit description.

The rotor core 12F is different from the rotor core 12 according to the first embodiment discussed above in that a projecting portion 128F is formed in the magnet hole portion 120F. The projecting portion 128F is provided on a wall surface 121F of the magnet hole portion 120F on the radially inner side. The projecting portion 128F projects in the radial direction toward the center portion of the permanent magnet 14 in the circumferential direction. That is, the projecting portion 128F does not face, in the radial direction, both end portions of the permanent magnet 14 in the circumferential direction. The projecting portion 128F is provided to extend over the entire rotor core 12F in the axial direction. A clearance in the radial direction between the projecting portion 128F and the center portion of the permanent magnet 14 in the circumferential direction may be a minimum clearance required to assemble the permanent magnet 14 to the magnet hole portion 120F.

The adhesive layer 16F is the same as the adhesive layer 16 according to the first embodiment discussed above except for the location of formation. That is, the adhesive layer 16F is formed by heating an adhesive compounded with capsules that are expanded when heated.

The adhesive layer 16F is provided at both ends of the permanent magnet 14 in the circumferential direction with a space therebetween in the circumferential direction. Specifically, the adhesive layer 16F includes a first adhesive layer 161F and a second adhesive layer 162F. The first adhesive layer 161F is provided at one end, in the circumferential direction, of the wall surface 121F of the magnet hole portion 120F on the radially inner side. The second adhesive layer 162F is provided at the other end, in the circumferential direction, of the wall surface 121F. The first adhesive layer 161F and the second adhesive layer 162F are provided to extend over the entire permanent magnet 14 in the axial direction. The first adhesive layer 161F and the second adhesive layer 162F are apart from each other in the circumferential direction. The projecting portion 128F is positioned between the first adhesive layer 161F and the second adhesive layer 162F in the circumferential direction. In other words, the first adhesive layer 161F and the second adhesive layer 162F are provided on the outer side in the circumferential direction with respect to the projecting portion 128F.

With the example illustrated in FIG. 12, an effect that is similar to that of the first embodiment discussed above can be obtained. That is, the permanent magnet 14 is fixed by being positioned with respect to the magnet hole portion 120 in such a manner as to contact the tapered surfaces 125 and 126 (see FIGS. 4A and 4B) of the wall surface 122 of the magnet hole portion 120 on the radially outer side (that is, in such a manner as to be positioned in the radial direction).

In general, magnetic saturation tends to be caused at positions corresponding to both ends of the magnet hole portion 120F in the circumferential direction, among positions of the rotor core 12F in the circumferential direction, more than at a position corresponding to the center portion of the magnet hole portion 120F in the circumferential direction. That is, magnetic saturation tends to be caused in a region of the rotor core 12F that is close to end portions of the magnet hole portion 120F in the circumferential direction.

In this respect, in the example illustrated in FIG. 12, the rotor core 12F includes the projecting portion 128F at a position corresponding to the center portion of the magnet hole portion 120F in the circumferential direction. Consequently, a magnetic resistance can be reduced and, as a result, the torque properties of the rotary electric machine can be improved compared to a case where the projecting portion 128F is not provided. With the example illustrated in FIG. 12, in addition, the magnetic resistance can be reduced efficiently compared to a case where similar projecting portions are provided at positions corresponding to both ends of the magnet hole portion in the circumferential direction. This is because magnetic saturation tends to be caused at positions corresponding to both ends of the magnet hole portion 120F in the circumferential direction as discussed above. In this way, with the example illustrated in FIG. 12, the magnetic resistance can be reduced efficiently while enjoying the effect of the adhesive layer 16F discussed above by providing the projecting portion 128F in a region in which magnetic saturation does not tend to be caused in the circumferential direction while providing the adhesive layer 16F in a region in which magnetic saturation tends to be caused in the circumferential direction.

Figure 13:
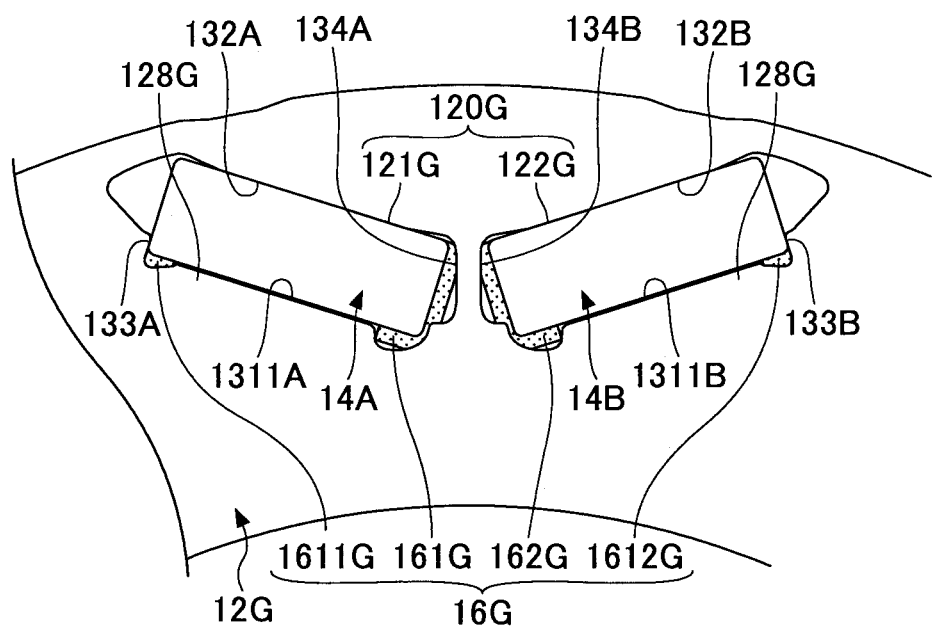
FIG. 13 is a plan view of a portion of a rotor.

The rotor 10G illustrated in FIG. 13 is different from the rotor 10B illustrated in FIG. 8 and discussed above in that the rotor core 12B has been replaced with a rotor core 12G and the adhesive layer 16B has been replaced with an adhesive layer 16G Hereinafter, constituent elements that are the same as those of the rotor 10B illustrated in FIG. 8 and discussed above are given the same reference numerals to omit description.

The rotor core 12G is different from the rotor core 12B according to the example illustrated in FIG. 8 and discussed above in that a projecting portion 128G is formed in a magnet hole portion 120G The projecting portion 128G is provided in each of a first magnet hole 121G and a second magnet hole 122G of the magnet hole portion 120G As in the rotor 10F illustrated in FIG. 12, the projecting portion 128G is provided on each of wall surfaces 1311A and 1311B of the first magnet hole 121G and the second magnet hole 122G, respectively, on the radially inner side. The projecting portion 128G in the first magnet hole 121G projects in the radial direction toward the center portion of the permanent magnet 14A in the circumferential direction. That is, the projecting portion 128G in the first magnet hole 121G does not face, in the radial direction, both end portions of the permanent magnet 14A in the circumferential direction. The projecting portion 128G in the second magnet hole 122G projects in the radial direction toward the center portion of the permanent magnet 14B in the circumferential direction. That is, the projecting portion 128G in the second magnet hole 122G does not face, in the radial direction, both end portions of the permanent magnet 14B in the circumferential direction. The projecting portion 128G is provided to extend over the entire rotor core 12G in the axial direction. A clearance in the radial direction between the projecting portion 128G and the center portion of the permanent magnet 14 in the circumferential direction may be a minimum clearance required to assemble the permanent magnets 14A and 14B to the magnet hole portion 120G.

The adhesive layer 16G is the same as the adhesive layer 16B according to the example illustrated in FIG. 8 and discussed above except for the location of formation. That is, the adhesive layer 16G is formed by heating an adhesive compounded with capsules that are expanded when heated.

As illustrated in FIG. 13, the adhesive layer 16G includes an adhesive layer 161G and an adhesive layer 1611G provided for the first magnet hole 121G and an adhesive layer 162G and an adhesive layer 1612G provided for the second magnet hole 122G.

The adhesive layer 161G and the adhesive layer 1611G fix the permanent magnet 14A with respect to the first magnet hole 121G As illustrated in FIG. 13, the adhesive layer 161G and the adhesive layer 1611G are provided only on the wall surface 1311A of the first magnet hole 121G on the radially inner side, of the wall surface 1311A on the inner side in the radial direction and the wall surface 132A on the outer side in the radial direction, and the wall surface 134A of the first magnet hole 121G on one side (in the example, the side closer to the second magnet hole 122G) in the circumferential direction, of the wall surface 133A and the wall surface 134A of the first magnet hole 121G on both sides in the circumferential direction. Consequently, as illustrated in FIG. 13, the permanent magnet 14A is fixed by being positioned with respect to the first magnet hole 121G in such a manner as to contact the wall surface 132A of the first magnet hole 121G on the radially outer side and the wall surface 133A on the other side in the circumferential direction (that is, in such a manner as to be positioned in the radial direction and the circumferential direction) through thermal expansion of the adhesive during formation of the adhesive layer 161G and the adhesive layer 1611G.

The adhesive layer 161G and the adhesive layer 1611G are provided at both ends of the permanent magnet 14A in the circumferential direction with a space therebetween in the circumferential direction. Specifically, the adhesive layer 161G is provided at one end, in the circumferential direction, of the wall surface 1311A on the radially inner side, and the adhesive layer 1611G is provided at the other end, in the circumferential direction, of the wall surface 1311A on the inner side in the radial direction. The adhesive layer 161G and the adhesive layer 1611G are provided to extend over the entire permanent magnet 14A in the axial direction. The adhesive layer 161G and the adhesive layer 1611G are apart from each other in the circumferential direction. The projecting portion 128G is positioned between the adhesive layer 161G and the adhesive layer 1611G in the circumferential direction. In other words, the adhesive layer 161G and the adhesive layer 1611G are provided on the outer side in the circumferential direction with respect to the projecting portion 128G.

The adhesive layer 162G and the adhesive layer 1612G fix the permanent magnet 14B with respect to the second magnet hole 122G As illustrated in FIG. 13, the adhesive layer 162G and the adhesive layer 1612G are provided only on the wall surface 1311B of the second magnet hole 122G on the radially inner side, of the wall surface 1311B on the inner side in the radial direction and the wall surface 132B on the outer side in the radial direction, and the wall surface 134B of the second magnet hole 122G on one side (in the example, the side closer to the first magnet hole 121G) in the circumferential direction, of the wall surface 133B and the wall surface 134B of the second magnet hole 122G on both sides in the circumferential direction. Consequently, as illustrated in FIG. 13, the permanent magnet 14B is fixed by being positioned with respect to the second magnet hole 122G in such a manner as to contact the wall surface 132B of the second magnet hole 122G on the radially outer side and the wall surface 133B on the other side in the circumferential direction (that is, in such a manner as to be positioned in the radial direction and the circumferential direction) through thermal expansion of the adhesive during formation of the adhesive layer 162G and the adhesive layer 1612G.

The adhesive layer 162G and the adhesive layer 1612G are provided at both ends of the permanent magnet 14B in the circumferential direction with a space therebetween in the circumferential direction. Specifically, the adhesive layer 162G is provided at one end, in the circumferential direction, of the wall surface 1311B on the inner side in the radial direction, and the adhesive layer 1612G is provided at the other end, in the circumferential direction, of the wall surface 1311B on the inner side in the radial direction. The adhesive layer 162G and the adhesive layer 1612G are provided to extend over the entire permanent magnet 14B in the axial direction. The adhesive layer 162G and the adhesive layer 1612G are apart from each other in the circumferential direction. The projecting portion 128G is positioned between the adhesive layer 162G and the adhesive layer 1612G in the circumferential direction. In other words, the adhesive layer 162G and the adhesive layer 1612G are provided on the outer side in the circumferential direction with respect to the projecting portion 128G.

With the example illustrated in FIG. 13, an effect that is similar to that of the example illustrated in FIG. 12 can be obtained in addition to an effect that is similar to that of the example illustrated in FIG. 8 and discussed above.

Figure 14:
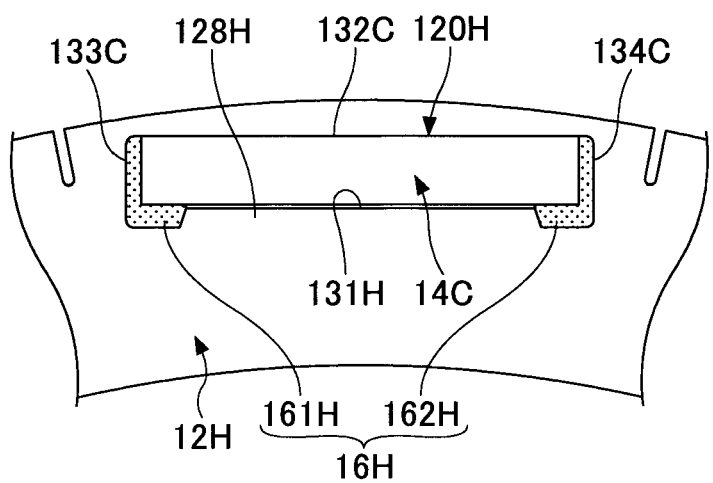
FIG. 14 is a plan view of a portion of a rotor.

The rotor 10H illustrated in FIG. 14 is different from the rotor 10C illustrated in FIG. 9 and discussed above in that the rotor core 12C has been replaced with a rotor core 12H and the adhesive layer 16C has been replaced with an adhesive layer 16H. Hereinafter, constituent elements that are the same as those of the rotor 10C illustrated in FIG. 9 and discussed above are given the same reference numerals to omit description.

The rotor core 12H is different from the rotor core 12C according to the example illustrated in FIG. 9 and discussed above in that a projecting portion 128H is formed in a magnet hole portion 120H. The projecting portion 128H is provided on a wall surface 131F of the magnet hole portion 120H on the radially inner side. The projecting portion 128H projects in the radial direction toward the center portion of the permanent magnet 14C in the circumferential direction. That is, the projecting portion 128H does not face, in the radial direction, both end portions of the permanent magnet 14C in the circumferential direction. The projecting portion 128H is provided to extend over the entire rotor core 12H in the axial direction. A clearance in the radial direction between the projecting portion 128H and the center portion of the permanent magnet 14C in the circumferential direction may be a minimum clearance required to assemble the permanent magnet 14C to the magnet hole portion 120H.

The adhesive layer 16H is the same as the adhesive layer 16C according to the example illustrated in FIG. 9 and discussed above except for the location of formation. That is, the adhesive layer 16H is formed by heating an adhesive compounded with capsules that are expanded when heated.

The adhesive layer 16H is provided at both ends of the permanent magnet 14C in the circumferential direction with a space therebetween in the circumferential direction. Specifically, the adhesive layer 16H includes a first adhesive layer 161H and a second adhesive layer 162H. The first adhesive layer 161H is provided at one end, in the circumferential direction, of the wall surface 131H of the magnet hole portion 120H on the inner side in the radial direction and on the wall surface 133C. The second adhesive layer 162H is provided at the other end, in the circumferential direction, of the wall surface 131H and on the wall surface 134C. The first adhesive layer 161H and the second adhesive layer 162H are provided to extend over the entire permanent magnet 14C in the axial direction. The first adhesive layer 161H and the second adhesive layer 162H are apart from each other in the circumferential direction. The projecting portion 128H is positioned between the first adhesive layer 161H and the second adhesive layer 162H in the circumferential direction. In other words, the first adhesive layer 161H and the second adhesive layer 162H are provided on the outer side in the circumferential direction with respect to the projecting portion 128H.

With the example illustrated in FIG. 14, an effect that is similar to that of the example illustrated in FIG. 12 can be obtained in addition to an effect that is similar to that of the example illustrated in FIG. 9 and discussed above.

Figure 15:
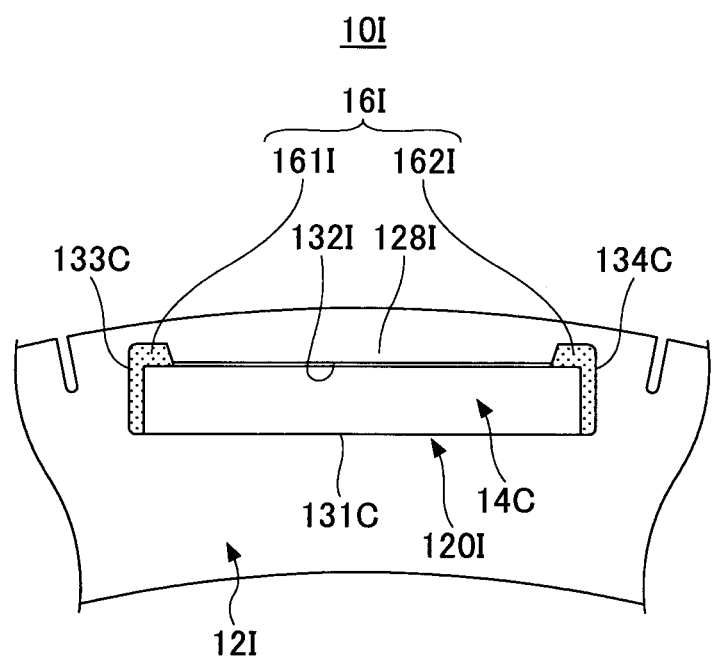
FIG. 15 is a plan view of a portion of a rotor.

The rotor 10I illustrated in FIG. 15 is different from the rotor 10D illustrated in FIG. 10 and discussed above in that the rotor core 12C has been replaced with a rotor core 12I and the adhesive layer 16D has been replaced with an adhesive layer 16I. Hereinafter, constituent elements that are the same as those of the rotor 10D illustrated in FIG. 10 and discussed above are given the same reference numerals to omit description.

The rotor core 12I is different from the rotor core 12D according to the example illustrated in FIG. 10 and discussed above in that a projecting portion 128I is formed in a magnet hole portion 120I. The projecting portion 128I is provided on a wall surface 132I of the magnet hole portion 120I on the radially outer side. The projecting portion 128I projects in the radial direction toward the center portion of the permanent magnet 14C in the circumferential direction. That is, the projecting portion 128I does not face, in the radial direction, both end portions of the permanent magnet 14C in the circumferential direction. The projecting portion 128I is provided to extend over the entire rotor core 12I in the axial direction. A clearance in the radial direction between the projecting portion 128I and the center portion of the permanent magnet 14C in the circumferential direction may be a minimum clearance required to assemble the permanent magnet 14C to the magnet hole portion 120F.

The adhesive layer 16I is the same as the adhesive layer 16C according to the example illustrated in FIG. 10 and discussed above except for the location of formation. That is, the adhesive layer 16I is formed by heating an adhesive compounded with capsules that are expanded when heated.

The adhesive layer 16I is provided at both ends of the permanent magnet 14C in the circumferential direction with a space therebetween in the circumferential direction. Specifically, the adhesive layer 16I includes a first adhesive layer 161I and a second adhesive layer 162I. The first adhesive layer 161I is provided at one end, in the circumferential direction, of the wall surface 132I of the magnet hole portion 120I on the outer side in the radial direction and on the wall surface 133C. The second adhesive layer 162I is provided at the other end, in the circumferential direction, of the wall surface 132I and on the wall surface 134C. The first adhesive layer 161I and the second adhesive layer 162I are provided to extend over the entire permanent magnet 14C in the axial direction. The first adhesive layer 161I and the second adhesive layer 162I are apart from each other in the circumferential direction. The projecting portion 128I is positioned between the first adhesive layer 161I and the second adhesive layer 162I in the circumferential direction. In other words, the first adhesive layer 161I and the second adhesive layer 162I are provided on the outer side in the circumferential direction with respect to the projecting portion 128I.

With the example illustrated in FIG. 15, an effect that is similar to that of the example illustrated in FIG. 12 can be obtained in addition to an effect that is similar to that of the example illustrated in FIG. 10 and discussed above.

Although embodiments have been discussed in detail above, the present disclosure is not limited to specific embodiments, and a variety of modifications and changes may be made without departing from the scope of the invention. In addition, all or a plurality of the constituent elements according to the embodiments discussed earlier may be combined with each other.

For example, in the first embodiment discussed above, the tapered surface 125 is formed to be continuous with the center portion of the wall surface 122 in the circumferential direction. However, another surface may be interposed between the center portion of the wall surface 122 in the circumferential direction and the tapered surface 125. The same also applies to the tapered surface 126.

In each of the embodiments discussed above, the present disclosure is applied to a rotary electric machine of an inner rotor type. However, the present disclosure may also be applied to a rotary electric machine of an outer rotor type. In the case of a rotary electric machine of an outer rotor type, basically, the arrangement of components is simply flipped in the radial direction.

In addition, the cooling structure according to the second embodiment may be applied to each of the embodiments illustrated in FIGS. 8 to 11. That is, the oil passage 70 may be formed in each adhesive layer (such as the adhesive layer 16B).

In relation to the embodiments described above, the following configurations are further disclosed.

(1)

A rotor (10, 10A to 10I) for a rotary electric machine, including:

a rotor core (12, 12B to 12I) that has a magnet hole portion (120, 120B to 120I);

a permanent magnet (14, 14A, 14B, 14C) inserted into the magnet hole portion (120, 120B to 120I); and an adhesive layer (16, 16A to 16I) provided between the permanent magnet (14, 14A, 14B, 14C) and a wall surface of the magnet hole portion (120, 120B to 120I) and including a plurality of capsule bodies (92) therein, the adhesive layer (16, 16A to 16I) fixing the permanent magnet (14, 14A, 14B, 14C) to the wall surface of the magnet hole portion (120, 120B to 120I), in which the adhesive layer (16, 16A to 16I) is provided only on a wall surface of the magnet hole portion (120, 120B to 120I) on a first side, which is one of a wall surface (121, 121F, 131A to 131C, 131H, 131I, 1311A, 1311B) of the magnet hole portion (120, 120B to 120I) on an inner side in a radial direction and a wall surface (122, 132A to 132C, 132I) on an outer side in the radial direction.

With the configuration according to (1), the adhesive layer (16, 16A to 16I) which includes the plurality of capsule bodies (92) therein can easily bring the permanent magnet (14, 14A, 14B, 14C) into surface contact (i.e. press over a surface), without a clearance, with the wall surface (122) of the magnet hole portion (120, 120B to 120I) on the side (second side) opposite to the wall surface on the first side on which the adhesive layer (16, 16A to 16I) is provided. That is, the permanent magnet (14, 14A, 14B, 14C) can be reliably brought into contact (pressed into contact) with the wall surface of the magnet hole portion (120, 120B to 120I) on the side (second side) opposite to the wall surface on the first side by use of expansion of the adhesive which forms the adhesive layer (16, 16A to 16I) (expansion of the plurality of capsule bodies (92)) during heating. Consequently, it is possible to obtain the rotor (10, 10A to 10I) in which the permanent magnet (14, 14A, 14B, 14C) is positioned at least in the radial direction with respect to the magnet hole portion (120, 120B to 120I) without using a narrow streak member.

(2)

The rotor (10, 10A, 10F) for a rotary electric machine according to (1), in which:

a wall surface of the magnet hole portion (120, 120F) on a second side includes tapered surfaces (125, 126) connected to wall surfaces (123, 124) on both sides in a circumferential direction;

the permanent magnet (14) has tapered surfaces (145, 146) that make surface contact with the tapered surfaces (125, 126) of the magnet hole portion (120); and the adhesive layer (16, 16F) is provided only on the wall surface on the first side, of wall surfaces (121 to 124: 121F, 122 to 144) of the magnet hole portion (120) on four sides. With the configuration described in (2), the permanent magnet (14) can be brought into surface contact, without a clearance, with the wall surface of the magnet hole portion (120, 120F) on the side (second side) opposite to the wall surface on the first side by use of expansion of the adhesive which forms the adhesive layer (16, 16F) during heating. During the expansion of the adhesive which forms the adhesive layer (16, 16F) during heating, the tapered surfaces (145, 146) of the permanent magnet (14) are guided so as to make surface contact with the tapered surfaces (125, 126) of the magnet hole portion (120, 120F), and thus the permanent magnet (14) can be positioned not only in the radial direction but also in the circumferential direction.

(3)

The rotor (10B, 10G) for a rotary electric machine according to (1), in which:

the magnet hole portion (120B, 120G) includes a first magnet hole (121B, 121G) and a second magnet hole (122B, 122G) disposed in a V-shape;

the adhesive layer (161B, 161G) for the first magnet hole (121B, 121G) is provided only on a wall surface of the first magnet hole (121B, 121G) on the first side, of a wall surface (131A) of the first magnet hole (121B, 121G) on the inner side in the radial direction and a wall surface (132A) on the outer side in the radial direction, and a wall surface of the first magnet hole (121B, 121G) on one side, of wall surfaces (133A, 134A) of the first magnet hole (121B, 121G) on both sides in a circumferential direction; and the adhesive layer (162B, 162G) for the second magnet hole (122B, 122G) is provided only on a wall surface of the second magnet hole (122B, 122G) on the first side, of a wall surface (131B) of the second magnet hole (122B, 122G) on the inner side in the radial direction and a wall surface (132B) on the outer side in the radial direction, and a wall surface of the second magnet hole (122B, 122G) on any side, of wall surfaces (133B, 134B) of the second magnet hole (122B, 122G) on both sides in the circumferential direction. With the configuration described in (3), the permanent magnet (14A, 14B) can be brought into surface contact, without a clearance, with the wall surface of the magnet hole (121B, 122B: 121G, 122G) on the side (second side) opposite to the wall surface on the first side by use of expansion of the adhesive which forms the adhesive layer (16) during heating. In addition, the adhesive layer (161B, 161G) is positioned only on a wall surface of the first magnet hole (121B, 121G) on one side, of wall surfaces (133A, 134A) of the first magnet hole (121B, 121G) on both sides in the circumferential direction. Thus, the permanent magnet (14A) can also be positioned in the circumferential direction with respect to the first magnet hole (121B, 121G). Similarly, the adhesive layer (162B, 162G) is positioned only on a wall surface of the second magnet hole (122B, 122G) on any side, of wall surfaces (133B, 134B) of the second magnet hole (122B, 122G) on both sides in the circumferential direction. Thus, the permanent magnet (14B) can also be positioned in the circumferential direction with respect to the second magnet hole (122B, 122G).

(4)

The rotor (10C, 10E, 10H, 10I) for a rotary electric machine according to (1), in which:

a wall surface of the magnet hole portion (120C, 120H, 120I) on a second side is connected to wall surfaces (133C, 134C) on both sides in a circumferential direction not via tapered surfaces; and the adhesive layer (16C to 16E, 16H, 16I) is provided only on the wall surface of the magnet hole portion (120C, 120H, 120I) on the first side and a wall surface of the magnet hole portion (120C, 120H, 120I) on at least one side, of wall surfaces (133C, 134C) on both sides in the circumferential direction, of wall surfaces (131C to 134C, 131H, 132C to 134C) of the magnet hole portion (120C, 120H, 120I) on four sides. With the configuration described in (4), the permanent magnet (14C) can be brought into surface contact, without a clearance, with the wall surface of the magnet hole portion (120C, 120H, 120I) on the side (second side) opposite to the wall surface on the first side by use of expansion of the adhesive which forms the adhesive layer (16C to 16E, 16H, 16I) during heating.

(5)

The rotor (10A) for a rotary electric machine according to any one of (1) to (4), in which:

the adhesive layer (16A) is provided only on the wall surface (121) of the magnet hole portion (120) on the inner side in the radial direction, of the wall surface (121) of the magnet hole portion (120) on the inner side in the radial direction and the wall surface (122) on the outer side in the radial direction; and the adhesive layer (16A) which is provided for the wall surface (121) on the inner side in the radial direction forms an oil passage (70) between both ends of the permanent magnet (14) in a circumferential direction, the oil passage (70) being blocked on both sides in the circumferential direction and opening at both ends in an axial direction of the rotor core (12).

With the configuration described in (5), the permanent magnet (14) can be brought into surface contact, without a clearance, with the wall surface (122) of the magnet hole portion (120) on the outer side in the radial direction, which is opposite to the wall surface on the first side, by use of expansion of the adhesive which forms the adhesive layer (16A) during heating. In addition, the oil passage (70) which is blocked on both sides in the circumferential direction can be formed between both ends of the adhesive layer (16A) in the circumferential direction, which makes it possible to cool the permanent magnet (14). In addition, the oil passage (70) is defined by the permanent magnet (14) on the radially outer side. Thus, it is possible to reduce leakage of oil which may be caused in the case where the oil passage (70) is defined by the rotor core which is formed from stacked steel sheets on the radially outer side.

(6)

The rotor (10F to 10I) for a rotary electric machine according to any one of (1) to (4), in which:

the rotor core (12F to 12I) has a projecting portion (128F to 128I) provided on the wall surface on the first side and projecting in the radial direction toward a center portion of the permanent magnet (14, 14A, 14B, 14C) in a circumferential direction; and the adhesive layer (16F to 16I) which is provided on the wall surface on the first side is positioned on an outer side with respect to the projecting portion (128F to 128I) in the circumferential direction.

With the configuration described in (6), the projecting portion (128F to 128I) is formed on the wall surface of the magnet hole portion (120F to 120I) on the first side in the rotor core (12F to 12I). Thus, a magnetic resistance can be reduced and the torque properties of the rotary electric machine can be improved compared to a case where the projecting portion (128F to 128I) is not formed. Magnetic saturation tends to be caused at end portions of the magnet hole portion (120F to 120I) in the circumferential direction, and the magnetic resistance cannot be reduced efficiently even if similar projecting portions are formed at end portions of the magnet hole portion (120F to 120I) in the circumferential direction. In consideration of this point, in the configuration described in (6), the adhesive layer (16F to 16I) which is provided on the wall surface on the first side is positioned on an outer side with respect to the projecting portion (128F to 128I) in the circumferential direction, that is, at end portions of the magnet hole portion (120F to 120I) in the circumferential direction. In this way, the magnetic resistance can be reduced efficiently while enjoying the effect of the adhesive layer (16F to 16I) discussed above by providing the projecting portion (128F to 128I) in a region in which magnetic saturation does not tend to be caused while providing the adhesive layer (16F to 16I) in a region in which magnetic saturation tends to be caused.

(7)

The rotor (10F to 10I) for a rotary electric machine according to (6), in which a clearance is provided between the projecting portion (128F to 128I) and the permanent magnet (14, 14A, 14B, 14C) in the radial direction.

With the configuration described in (7), the magnetic resistance can be reduced efficiently by the projecting portion (128F to 128I) while maintaining good assemblability of the permanent magnet (14, 14A, 14B, 14C) to the magnet hole portion 120 (128F to 128I).

(8)

A manufacturing method for a rotor (10, 10A to 10I) for a rotary electric machine, including:

a step of inserting a permanent magnet (14, 14A, 14B, 14C) into a magnet hole portion (120, 120B to 120I) of a rotor core (12, 12B, 12C);

an application step of applying an adhesive (90) including a plurality of capsule bodies (92) therein to a wall surface of the magnet hole portion (120, 120B to 120I) on a first side, which is one of a wall surface (121, 121F, 131A to 131C, 131H, 1311, 1311A, 1311B) of the magnet hole portion (120, 120B to 120I) on an inner side in a radial direction and a wall surface (122, 132A to 132C, 132I) on an outer side in the radial direction, or a surface of the permanent magnet (14, 14A, 14B, 14C) that faces the wall surface on the first side; and a step of forming an adhesive layer (16, 16A to 16I) by heating the adhesive (90).

With the manufacturing method according to (8), it is possible to obtain the rotor (10, 10A to 10I) according to (1) described above, for example.

(9)

The manufacturing method according to (8), in which:

a wall surface of the magnet hole portion (120, 120F) on a second side, which is opposite to the first side in the radial direction, includes tapered surfaces (125, 126) connected to wall surfaces (123, 124) on both sides in a circumferential direction, and the permanent magnet (14) has tapered surfaces (145, 146) that make surface contact with the tapered surfaces (125, 126) of the magnet hole portion (120, 120F); and the application step includes applying the adhesive (90) to the wall surface on the first side, of wall surfaces (121 to 124: 121F, 122 to 144) of the magnet hole portion on four sides, or a surface of the permanent magnet (14) that faces the wall surface on the first side.

With the manufacturing method according to (9), it is possible to obtain the rotor (10, 10A, 10F) according to (2) described above, for example.

(10)

The manufacturing method according to (8), in which:

the magnet hole portion (120B, 120G) includes a first magnet hole (121B, 121G) and a second magnet hole (122B, 122G) disposed in a V-shape;

the application step includes: applying the adhesive (90) to a wall surface of the first magnet hole (121B, 121G) on the first side, of a wall surface (131A) of the first magnet hole (121B, 121G) on an inner side in the radial direction and a wall surface (132A) on an outer side in the radial direction, and a wall surface of the first magnet hole (121B, 121G) on one side, of wall surfaces (133A, 134A) of the first magnet hole (121B, 121G) on both sides in a circumferential direction, or a surface of the permanent magnet (14A, 14B) that faces the wall surface on the first side; and for the adhesive layer (162B, 162G) of the second magnet hole (122B, 122G), applying the adhesive (90) to a wall surface of the second magnet hole (122B, 122G) on the first side, of a wall surface (131B) of the second magnet hole (122B, 122G) on the inner side in the radial direction and a wall surface (132B) on the outer side in the radial direction, and a wall surface of the second magnet hole (122B, 122G) on any side, of wall surfaces (133B, 134B) of the second magnet hole (122B, 122G) on both sides in the circumferential direction, or a surface of the permanent magnet (14A, 14B) that faces the wall surface on the any side.

With the manufacturing method according to (10), it is possible to obtain the rotor (10B, 10G) according to (3) described above, for example.

(11)

The manufacturing method according to (8), in which:

a wall surface of the magnet hole portion (120C, 120H, 120I) on a second side, which is opposite to the first side in the radial direction, is connected to wall surfaces (133C, 134C) on both sides in a circumferential direction not via tapered surfaces; and the application step includes applying the adhesive (90) to the wall surface on the first side, and a wall surface of the magnet hole portion (120C, 120H, 120I) on at least one side, of wall surfaces (133C, 134C) on both sides in the circumferential direction, of wall surfaces (131C to 134C, 131H, 132C to 134C) of the magnet hole portion (120C, 120H, 120I) on four sides or a surface of the permanent magnet (14C) that faces the wall surface on the one side.

With the manufacturing method according to (11), it is possible to obtain the rotor (10C, 10E, 10H, 10I) according to (4) described above, for example.

(12)

The manufacturing method according to any one of (8) to (11), in which:

the application step includes applying the adhesive (90) to the wall surface (121) of the magnet hole portion (120) on the inner side in the radial direction, of the wall surface (121) of the magnet hole portion (120) on the inner side in the radial direction and the wall surface (122) on the outer side in the radial direction, or a surface of the permanent magnet (14) that faces the wall surface on the inner side in the radial direction; and the adhesive layer (16A) which is formed on the wall surface on the inner side in the radial direction forms an oil passage (70) between both ends of the permanent magnet (14) in a circumferential direction, the oil passage (70) being blocked on both sides in the circumferential direction and opening at both ends in an axial direction of the rotor core (12).

With the manufacturing method according to (12), it is possible to obtain the rotor (10A) according to (5) described above, for example.

The present international application claims priority to Japanese Patent Application No. 2015-055062 filed on Mar. 18, 2015 and Japanese Patent Application No. 2015-173748 filed on Sep. 3, 2015, the entire contents of which are incorporated herein by reference.

The invention claimed is:

1. A rotor for a rotary electric machine, the rotor comprising:
    a rotor core that has a magnet hole;
    a permanent magnet inserted into the magnet hole; and
    an adhesive layer provided between the permanent magnet and a wall surface of the magnet hole and including a plurality of capsule bodies therein, the adhesive layer fixing the permanent magnet to the wall surface of the magnet hole, wherein
        the adhesive layer is provided only on a wall surface of the magnet hole on a first side, which is one of a wall surface of the magnet hole on an inner side in a radial direction and a wall surface on an outer side in the radial direction,
        the rotor core has a projecting portion provided on the wall surface on the first side and projecting in the radial direction toward a center portion of the permanent magnet in a circumferential direction,
        the adhesive layer which is provided on the wall surface on the first side is positioned on an outer side with respect to the projecting portion in the circumferential direction, and
        a clearance is provided between the projecting portion and the permanent magnet in the radial direction.

2. The rotor for a rotary electric machine according to claim 1, wherein:
    a wall surface of the magnet hole on a second side, which is opposite to the first side in the radial direction, includes tapered surfaces connected to wall surfaces on both sides in a circumferential direction;
    the permanent magnet has tapered surfaces that make surface contact with the tapered surfaces of the magnet hole; and
    the adhesive layer is provided only on the wall surface on the first side, of wall surfaces of the magnet hole on four sides.

3. The rotor for a rotary electric machine according to claim 1, wherein:
    the magnet hole includes a first magnet hole and a second magnet hole disposed in a V-shape;
    the adhesive layer for the first magnet hole is provided only on a wall surface of the first magnet hole on the first side, of a wall surface of the first magnet hole on the inner side in the radial direction and a wall surface on the outer side in the radial direction, and a wall surface of the first magnet hole on one side, of wall surfaces of the first magnet hole on both sides in a circumferential direction; and
    the adhesive layer for the second magnet hole is provided only on a wall surface of the second magnet hole on the first side, of a wall surface of the second magnet hole on the inner side in the radial direction and a wall surface on the outer side in the radial direction, and a wall surface of the second magnet hole on any side, of wall surfaces of the second magnet hole on both sides in the circumferential direction.

4. The rotor for a rotary electric machine according to claim 1, wherein:
    a wall surface of the magnet hole on a second side, which is opposite to the first side in the radial direction, is connected to wall surfaces on both sides in a circumferential direction not via tapered surfaces; and
    the adhesive layer is provided only on the wall surface of the magnet hole on the first side and a wall surface of the magnet hole on at least one side, of wall surfaces on both sides in the circumferential direction, of wall surfaces of the magnet hole on four sides.

5. The rotor for a rotary electric machine according to claim 1, wherein:
    the adhesive layer is provided only on the wall surface of the magnet hole on the inner side in the radial direction, of the wall surface of the magnet hole on the inner side in the radial direction and the wall surface on the outer side in the radial direction; and
    the adhesive layer which is provided for the wall surface on the inner side in the radial direction forms an oil passage between both ends of the permanent magnet in a circumferential direction, the oil passage being blocked on both sides in the circumferential direction and opening at both ends in an axial direction of the rotor core.

6. The rotor for a rotary electric machine according to claim 2, wherein:
    the adhesive layer is provided only on the wall surface of the magnet hole on the inner side in the radial direction, of the wall surface of the magnet hole on the inner side in the radial direction and the wall surface on the outer side in the radial direction; and
    the adhesive layer which is provided for the wall surface on the inner side in the radial direction forms an oil passage between both ends of the permanent magnet in a circumferential direction, the oil passage being blocked on both sides in the circumferential direction and opening at both ends in an axial direction of the rotor core.

7. A manufacturing method for a rotor for a rotary electric machine, the method comprising:
    inserting a permanent magnet into a magnet hole of a rotor core;
    applying an adhesive including a plurality of capsule bodies therein to a wall surface of the magnet hole on a first side, which is one of a wall surface of the magnet hole on an inner side in a radial direction and a wall surface on an outer side in the radial direction, or a surface of the permanent magnet that faces the wall surface on the first side; and forming an adhesive layer by heating the adhesive, wherein:

the rotor core has a projecting portion provided on the wall surface on the first side and projecting in the radial direction toward a center portion of the permanent magnet in a circumferential direction;

the adhesive layer which is formed on the wall surface on the first side is positioned on an outer side with respect to the projecting portion in the circumferential direction; and a clearance is provided between the projecting portion and the permanent magnet in the radial direction.

8. The manufacturing method according to claim 7, wherein:

a wall surface of the magnet hole on a second side, which is opposite to the first side in the radial direction, includes tapered surfaces connected to wall surfaces on both sides in a circumferential direction, and the permanent magnet has tapered surfaces that make surface contact with the tapered surfaces of the magnet hole; and applying the adhesive includes applying the adhesive to the wall surface on the first side, of wall surfaces of the magnet hole on four sides, or a surface of the permanent magnet that faces the wall surface on the first side.

9. The manufacturing method according to claim 7, wherein:

the magnet hole includes a first magnet hole and a second magnet hole disposed in a V-shape;

applying the adhesive includes includes:

applying the adhesive to a wall surface of the first magnet hole on the first side, of a wall surface of the first magnet hole on an inner side in the radial direction and a wall surface on an outer side in the radial direction, and a wall surface of the first magnet hole on one side, of wall surfaces of the first magnet hole on both sides in a circumferential direction, or a surface of the permanent magnet that faces the wall surface on the first side; and applying the adhesive to a wall surface of the second magnet hole on the first side, of a wall surface of the second magnet hole on the inner side in the radial direction and a wall surface on the outer side in the radial direction, or a surface of the permanent magnet that faces the wall surface on the first side, and a wall surface of the second magnet hole on any side, of wall surfaces of the second magnet hole on both sides in the circumferential direction, or a surface of the permanent magnet that faces the wall surface on the any side.

10. The manufacturing method according to claim 7, wherein:

a wall surface of the magnet hole on a second side, which is opposite to the first side in the radial direction, is connected to wall surfaces on both sides in a circumferential direction not via tapered surfaces; and applying the adhesive includes applying the adhesive to the wall surface on the first side, of wall surfaces of the magnet hole on four sides, or a surface of the permanent magnet that faces the wall surface on the first side, and a wall surface of the magnet hole on at least one side, of wall surfaces on both sides in the circumferential direction, or a surface of the permanent magnet that faces the wall surface on the one side.

11. The manufacturing method according to claim 7, wherein:

applying the adhesive includes applying the adhesive to the wall surface of the magnet hole on the inner side in the radial direction, of the wall surface of the magnet hole on the inner side in the radial direction and the wall surface on the outer side in the radial direction, or a surface of the permanent magnet that faces the wall surface on the inner side in the radial direction; and the adhesive layer which is formed on the wall surface on the inner side in the radial direction forms an oil passage between both ends of the permanent magnet in a circumferential direction, the oil passage being blocked on both sides in the circumferential direction and opening at both ends in an axial direction of the rotor core.

12. The manufacturing method according to claim 8, wherein:

applying the adhesive includes applying the adhesive to the wall surface of the magnet hole on the inner side in the radial direction, of the wall surface of the magnet hole on the inner side in the radial direction and the wall surface on the outer side in the radial direction, or a surface of the permanent magnet that faces the wall surface on the inner side in the radial direction; and the adhesive layer which is formed on the wall surface on the inner side in the radial direction forms an oil passage between both ends of the permanent magnet in a circumferential direction, the oil passage being blocked on both sides in the circumferential direction and opening at both ends in an axial direction of the rotor core.

* * * * *